United States Patent
Morrison et al.

(10) Patent No.: US 7,258,512 B2
(45) Date of Patent: Aug. 21, 2007

(54) DRILL CLAMP AND METHOD

(75) Inventors: James L. Morrison, O'Fallon, MO (US); Thomas O. Blankenship, St. Charles, MO (US); Kenneth W. Bates, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 519 days.

(21) Appl. No.: 10/866,222

(22) Filed: Jun. 11, 2004

(65) Prior Publication Data

US 2005/0111927 A1 May 26, 2005

Related U.S. Application Data

(60) Provisional application No. 60/524,179, filed on Nov. 21, 2003.

(51) Int. Cl.
*B23B 47/28* (2006.01)
*B23B 35/00* (2006.01)

(52) U.S. Cl. .......................... 408/1 R; 408/75; 408/97; 408/108; 408/81

(58) Field of Classification Search ................. 408/75, 408/79–81, 97, 103, 108, 1 R
See application file for complete search history.

(56) References Cited

U.S. PATENT DOCUMENTS

| | | | | |
|---|---|---|---|---|
| 1,748,093 A | * | 2/1930 | Wilder | 29/26 A |
| 3,120,136 A | * | 2/1964 | Bieker | 408/1 R |
| 3,526,158 A | * | 9/1970 | Adams et al. | 408/97 |
| 3,764,206 A | * | 10/1973 | Kammeraad | 408/75 |
| 4,601,618 A | * | 7/1986 | McEldowney | 408/1 R |
| 4,897,000 A | * | 1/1990 | Suzuki | 408/79 |
| 5,542,796 A | * | 8/1996 | Bratten et al. | 408/13 |
| 5,888,032 A | * | 3/1999 | Jensen | 408/1 R |
| 6,283,684 B1 | * | 9/2001 | Jarvis | 408/103 |
| 2004/0141821 A1 | * | 7/2004 | Otten | 408/103 |

FOREIGN PATENT DOCUMENTS

| | | | |
|---|---|---|---|
| DE | 529171 | * | 6/1931 |
| DE | 850978 | * | 7/1952 |
| DE | 4014210 A1 | * | 11/1991 |
| JP | 11179607 A | * | 7/1999 |
| SU | 323195 | * | 12/1971 |
| SU | 743790 | * | 2/1980 |

* cited by examiner

*Primary Examiner*—Daniel W. Howell
(74) *Attorney, Agent, or Firm*—Harness, Dickey & Pierce, P.L.C.

(57) ABSTRACT

A drill clamp comprising a clamp mechanism and a hole-locating pin. The clamp mechanism has a first clamp portion and a second clamp portion. The second clamp portion includes a drill-receiving opening sized for receiving a drill bit. The hole-locating pin is operatively connected to the first clamp portion. The clamp mechanism is adapted and configured for movement of the first and second clamp portions relative to each other between clamped and unclamped positions. The hole-locating pin is farther from the drill-receiving opening when the clamp mechanism is in the unclamped position than when the clamp mechanism is in the clamped position. The hole-locating pin and the drill-receiving opening are aligned with one another when the clamp mechanism is in the clamped position.

24 Claims, 7 Drawing Sheets

DRILL CLAMP AND METHOD

CROSS-REFERENCE TO RELATED APPLICATIONS

This application claims priority to U.S. provisional application 60/524,179, filed on Nov. 21, 2003. The application is hereby incorporated by reference herein.

STATEMENT REGARDING FEDERALLY SPONSORED RESEARCH OR DEVELOPMENT

The invention was made with Government support under Contract No. F33657-96-C-2059 awarded by the United States Air Force. The Government has certain rights in this invention.

Appendix

Not Applicable.

SUMMARY OF THE INVENTION

Generally, a drill clamp of the present invention comprises a clamp mechanism and a hole-locating pin. The clamp mechanism has a first clamp portion and a second clamp portion. The second clamp portion includes a drill-receiving opening sized for receiving a drill bit. The hole-locating pin is operatively connected to the first clamp portion. The clamp mechanism is adapted and configured for movement of the first and second clamp portions relative to each other between clamped and unclamped positions. The hole-locating pin is farther from the drill-receiving opening when the clamp mechanism is in the unclamped position than when the clamp mechanism is in the clamped position. The hole-locating pin and the drill-receiving opening are aligned with one another when the clamp mechanism is in the clamped position.

Another aspect of the present invention is a drill clamp comprising a clamp mechanism and a hole-locating pin. The clamp mechanism has a first clamp portion and a second clamp portion. The second clamp portion includes a drill-receiving opening. The hole-locating pin is operatively connected to the first clamp portion. The clamp mechanism being adapted and configured for movement of the first and second clamp portions relative to each other between clamped and unclamped positions. The hole-locating pin is adapted to engage a hole in a work-piece and to position the work-piece such that a drill bit inserted through the drill-receiving opening will engage the work-piece at a desired location.

Another aspect of the present invention is a method comprising providing a drill clamp and providing a work-piece. The drill clamp comprises a clamp mechanism and a hole-locating pin. The clamp mechanism has a first clamp portion and a second clamp portion. The second clamp portion includes a drill-receiving opening sized for receiving a drill bit. The hole-locating pin is operatively connected to the first clamp portion. The clamp mechanism is adapted and configured for movement of the first and second clamp portions relative to each other between clamped and unclamped positions. The hole-locating pin is farther from the drill-receiving opening when the clamp mechanism is in the unclamped position than when the clamp mechanism is in the clamped position. The work-piece has opposite first and second faces spaced from one another and a first hole extending from the first face toward the second face. The method further comprises: positioning the drill clamp, while in the unclamped position, relative to the work-piece, such that the hole-locating pin extends into the hole; moving the clamp mechanism to the clamped position such that the clamp mechanism is clamped against the first and second faces of the work-piece while the hole-locating pin is positioned in the hole; and placing a drill bit in the drill-receiving opening and using the drill bit to drill a second hole extending from the second face toward the first face, the second hole being aligned with the first hole.

Other features and advantages will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 3:
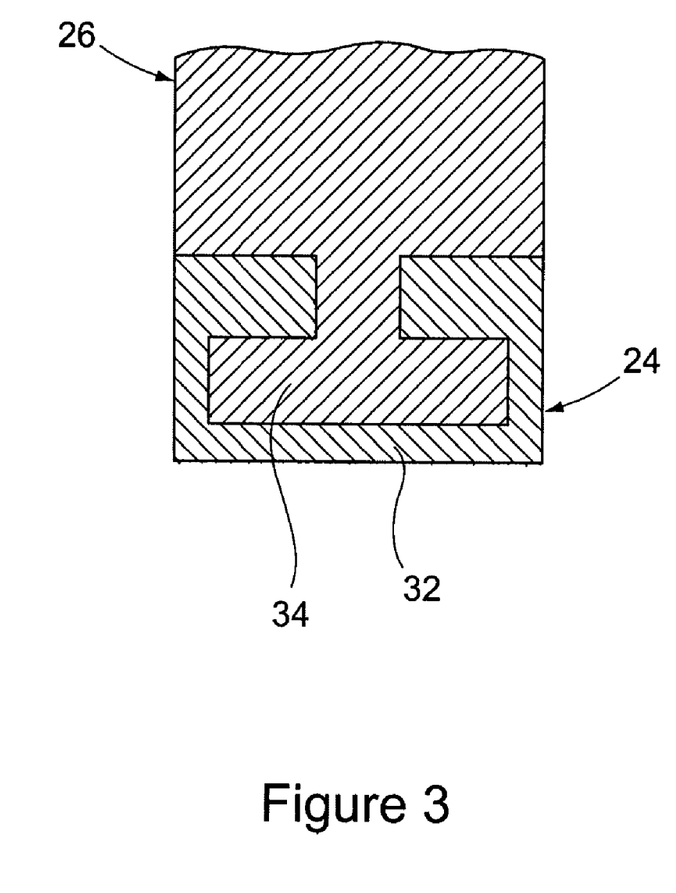
FIG. 3 is a cross-sectional view taken along the plane of line 3-3 of FIG. 2.

Referring now to the drawings, a drill clamp of the present invention is indicated in its entirety by the reference numeral 20. The drill clamp 20 is adapted to enable a user to locate a first hole in one side of a work-piece and drill an aligned hole in the other side of the work-piece. The drill clamp 20 comprises a clamp mechanism, generally indicated at 22, having a first clamp portion, generally indicated at 24, and a second clamp portion, generally indicated at 26. Preferably, the clamp mechanism 22 includes a slider mechanism, generally indicated at 30, to permit linear sliding of first and second clamp portions 24, 26 relative to each other. Preferably, the slider mechanism 30 comprises a C-shaped channel 32 and a channel-receiving tongue 34 (FIG. 3). In the preferred embodiment, the channel 32 is part of the first clamp portion 24 and the channel-receiving tongue 34 is part of the second clamp portion 26. However, it is to be understood that other mechanisms may be employed without departing from the scope of the present invention. Also, although relative movement of the first and second clamp portions are preferably linear along a straight line, it is to be understood that other alternative movements may be employed without departing from the scope of the present invention.

Figure 1:
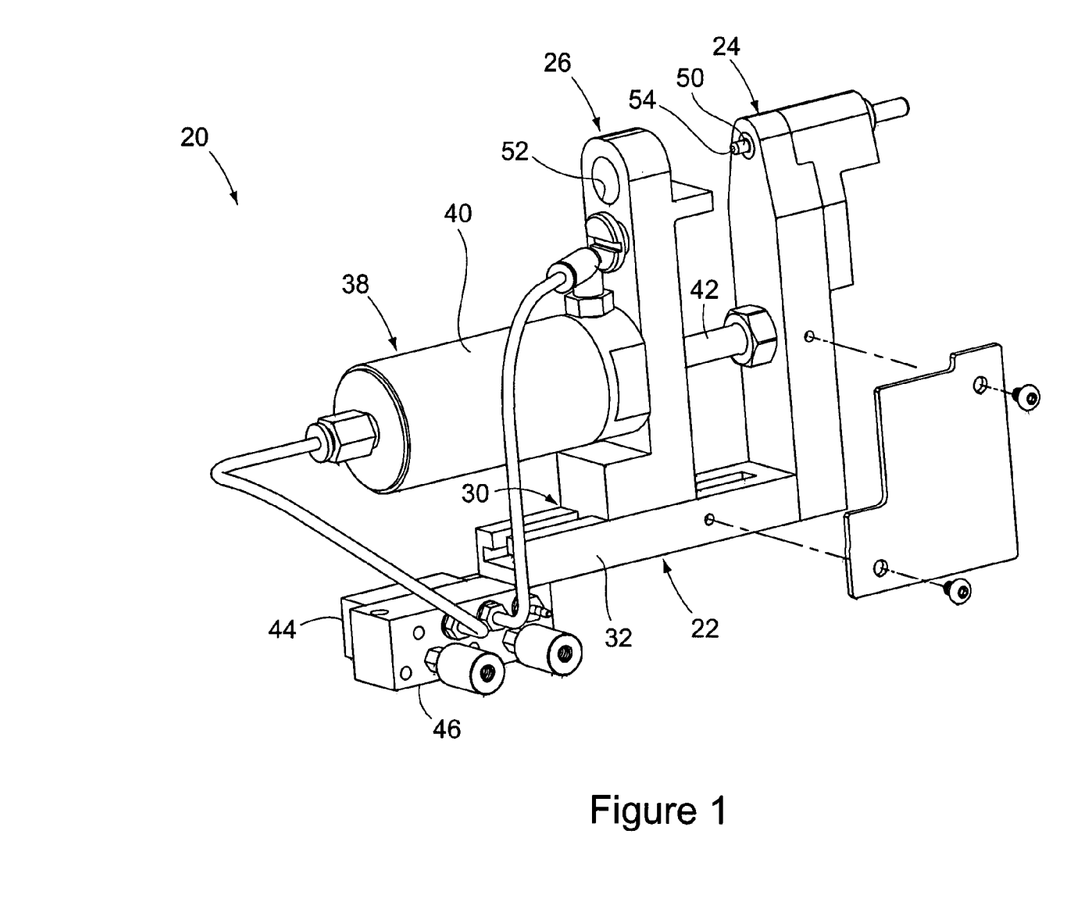
FIG. 1 is a perspective view of a drill clamp of the present invention.
Figure 2:
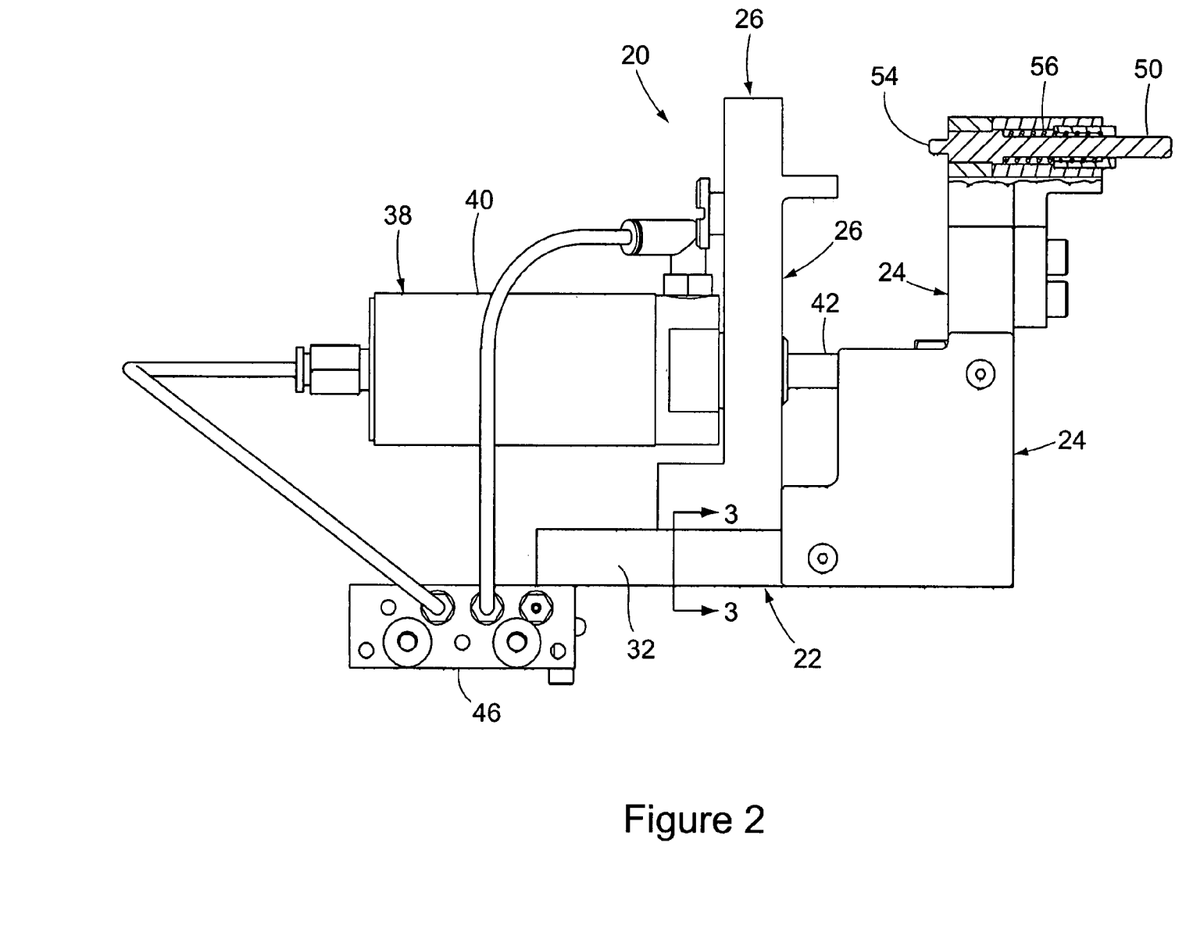
FIG. 2 is a side-elevational view of the drill clamp of FIG. 1, the drill clamp including a clamp mechanism and a spring-biased hole-locating pin, the clamp mechanism being in an unclamped position.
Figure 4:
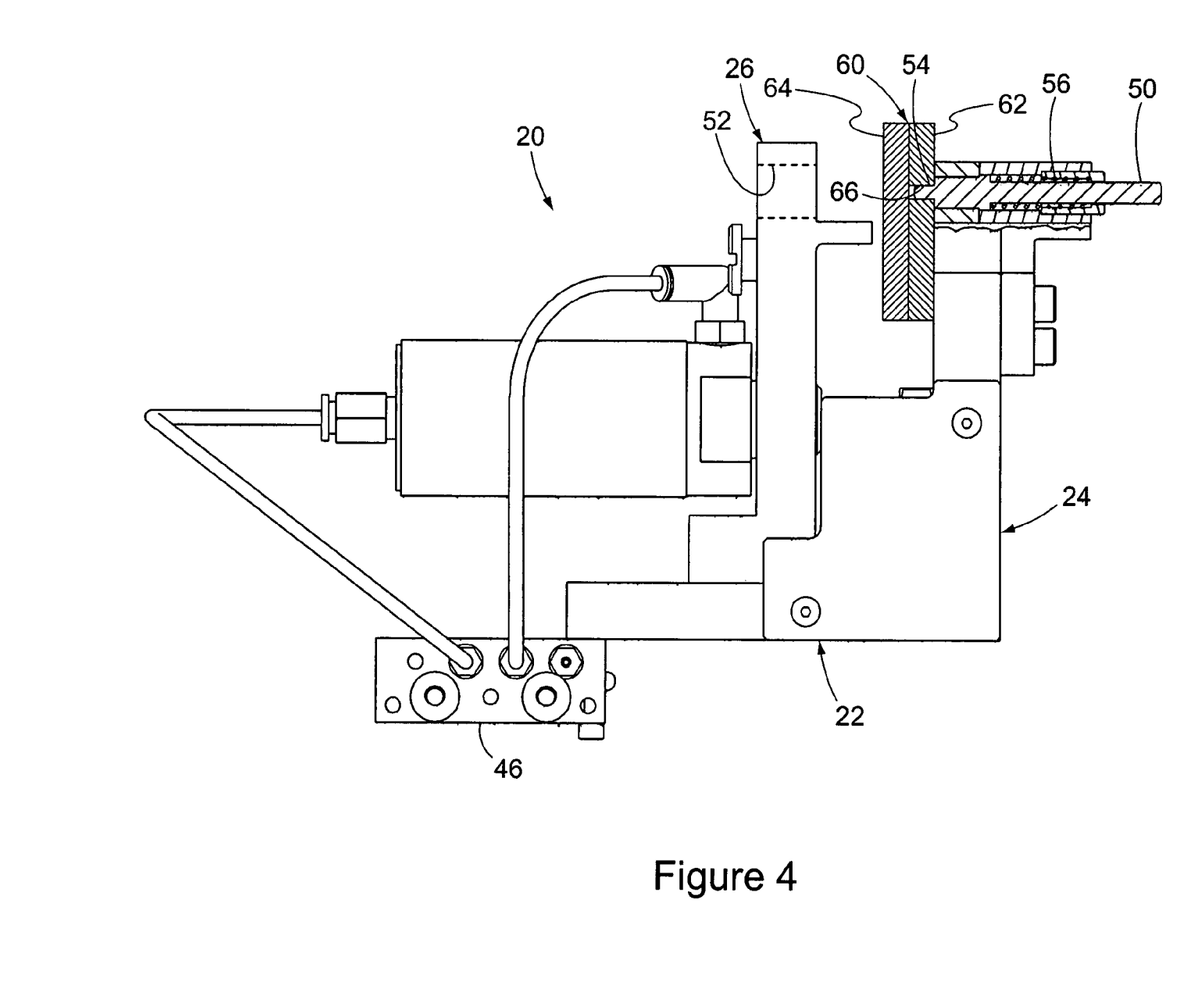
FIG. 4 is a side-elevational view of the drill clamp of FIG. 2 and including a work-piece, the work-piece including a first hole, the hole-locating pin of the drill clamp extending into the first hole.
Figure 5:
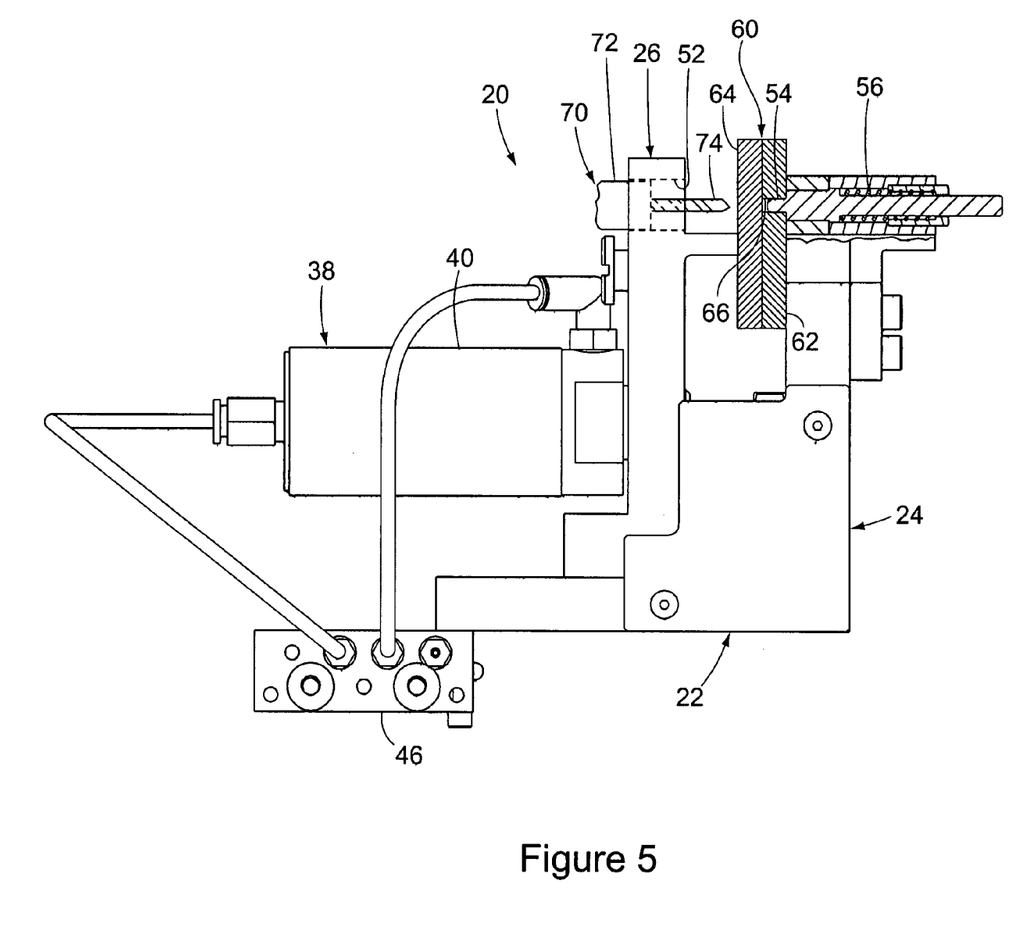
FIG. 5 is a side-elevational view of the drill clamp of FIG. 4 but with the drill clamp being in a clamped position.
Figure 6:
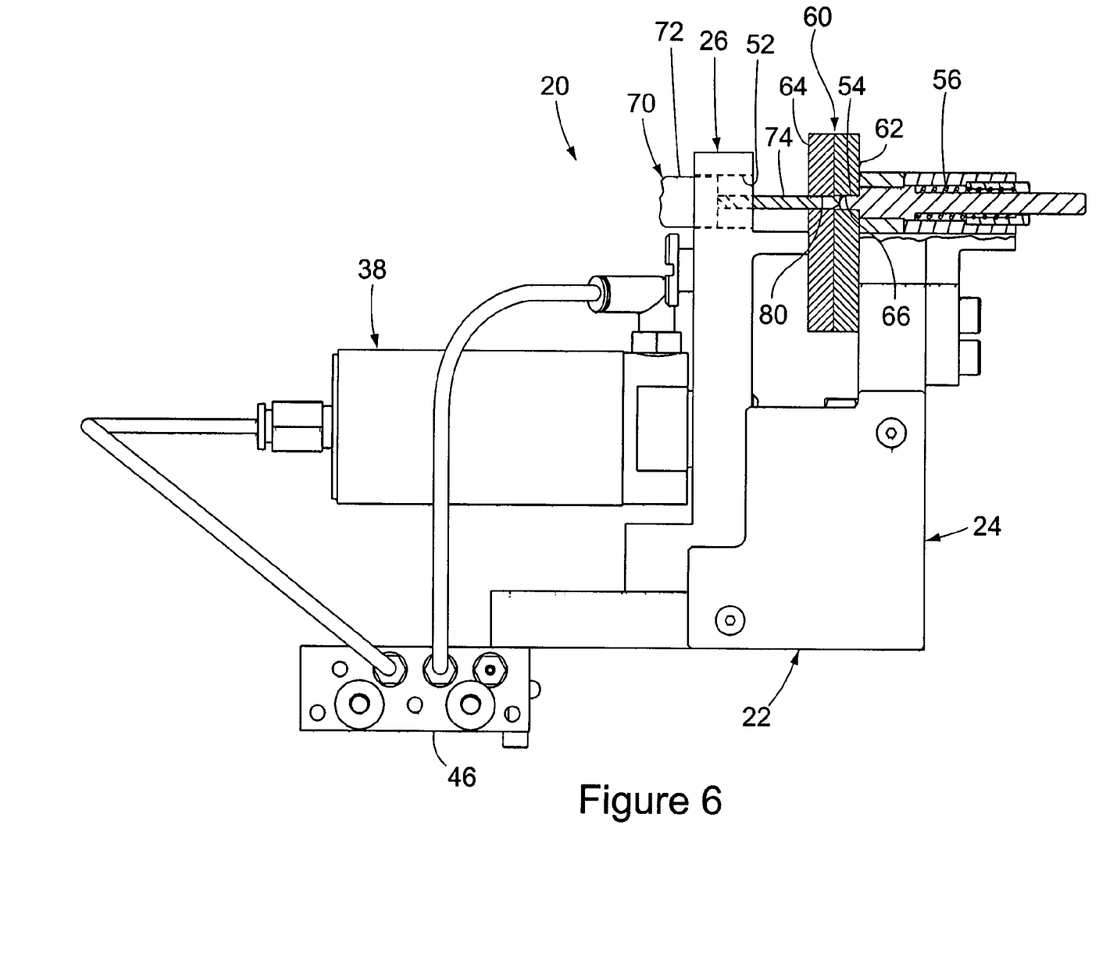
FIG. 6 is a side-elevational view of the drill clamp of FIG. 5 but showing a drill bit extending through a drill-receiving opening in the clamp mechanism.
Figure 7:
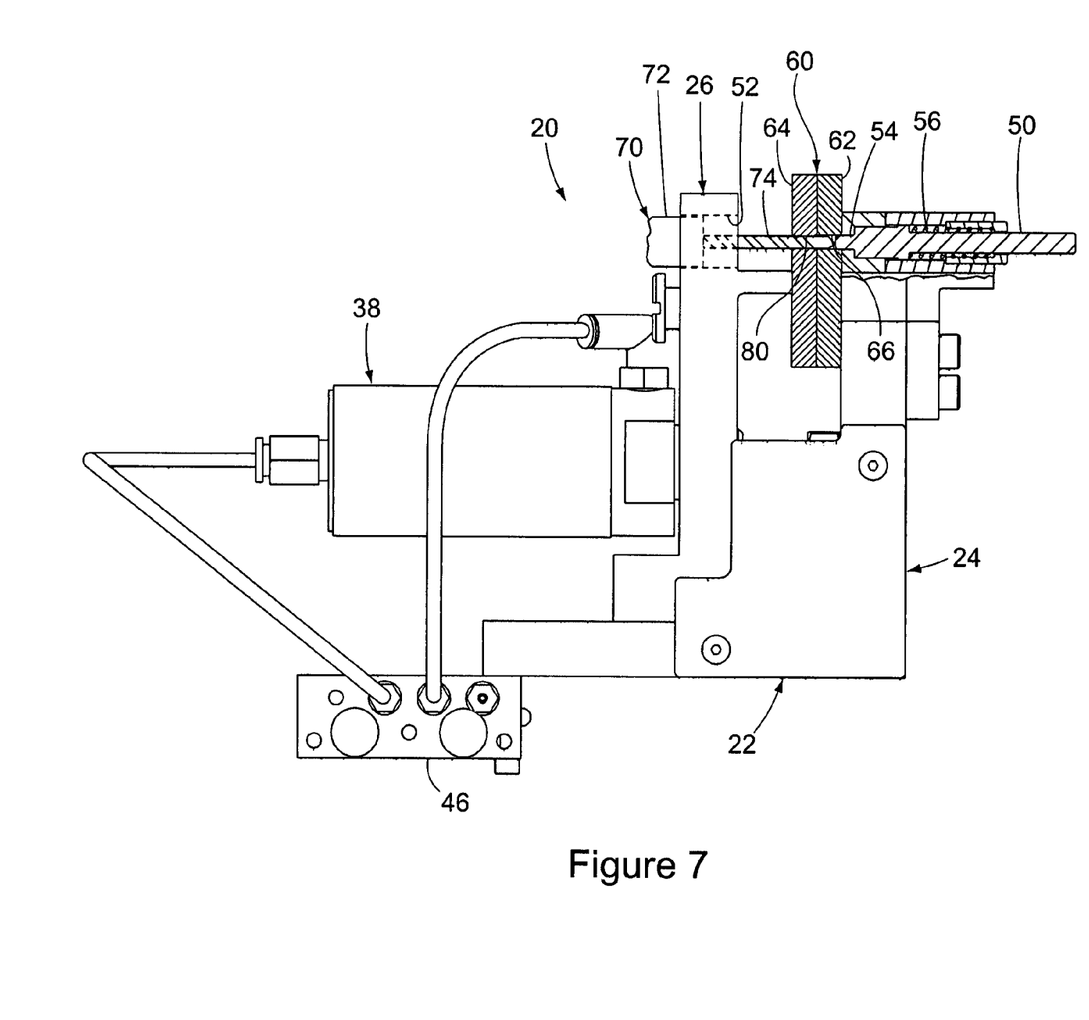
FIG. 7 is a side-elevational view of the drill clamp of FIG. 6 but showing the drill bit drilled through the work-piece to form a second hole aligned with the first hole such that the first and second holes form a through hole, the drill bit pushing against the hole locating pin in a direction counter to the spring bias of the hole-locating pin to move the pin.

The clamp mechanism 22 is adapted and configured for movement of the first and second clamp portions 24, 26 relative to each other between an unclamped position (FIGS. 2 and 4) and a clamped position (FIGS. 5-7). Preferably, the drill clamp 20 includes a double actuated air cylinder, generally indicated at 38, to move the first and second clamp portions 24, 26 between the unclamped and clamped positions. The cylinder 38 includes a cylinder body 40 secured to the second clamp portion 26 and a moveable rod 42 extending from the cylinder body and secured to the first clamp portion 24. The cylinder 38 also preferably includes a suitable valve mechanism 44 (FIG. 1) and a manifold mechanism 46. The valve mechanism 44 enables a user to extend and retract the rod 42. The manifold mechanism 46 is adapted to control the rate of movement of the rod 42. Although the drill clamp 20 preferably includes the air cylinder 38, it is to be understood that other mechanisms for moving the clamp mechanism 22 between the unclamped and clamped positions may be employed without departing from the scope of the present invention. For example, the air cylinder 38 may be replaced with a hydraulic cylinder, a motor driven screw mechanism or some other type of motor driven mechanism, a solenoid mechanism, or any other movement mechanism.

The drill clamp 20 further comprises a hole-locating pin 50 and a drill-receiving opening 52. Preferably, the hole-locating pin 50 extends through the first clamp portion 24. The hole-locating pin 50 includes a pin-tip 54 adapted to extend into a hole in a work-piece (described in greater detail below). The drill-receiving opening 52 is in the second clamp portion 26 and is sized for receiving a suitable drill bit. Preferably, the pin-tip 54 extends toward and is aligned with the center of the drill-receiving opening 52. Preferably, the hole-locating pin 50 is moveable between an extended position (FIGS. 1-2 and 3-6) and a retracted position (FIG. 7). Preferably, the drill clamp 20 includes a spring 56 for biasing the hole-locating pin 50 in the extended position.

A work-piece, generally indicated at 60, is shown in FIGS. 4-7. The work-piece 60 is shown as comprising two adjacent pieces of sheet metal. However, it is to be understood that other types of work-pieces may be employed without departing from the scope of this invention. The work-piece 60 has a first face 62, a second face 64 opposite the first face, and a first hole 66 extending from the first face toward the second face.

In use, the drill clamp 20, while in the unclamped position, is positioned relative to the work-piece 60 as shown in FIG. 4 such that the pin-tip 54 of the hole-locating pin 50 extends into the first hole 66. The air cylinder 38 is then actuated to retract the rod 42 in a manner to move the clamp mechanism 22 to the clamped position as shown in FIG. 5. In the clamped position, the work-piece 60 is securely held between the first and second clamp portions 24, 26. In the clamped position, the first clamp portion 24 is in engagement with the first face 62 of the work-piece 60 and the second clamp portion 26 is in engagement with the second face 64 of the work-piece. Next, a suitable drill bit assembly 70 is placed into the drill-receiving opening 52. Preferably, the drill bit assembly 70 includes a bushing 72 and a drill bit 74. The bushing 72 and drill-receiving opening 52 are preferably sized such that the bushing substantially fills the opening and centers the drill bit 74 in the opening. Also preferably, with the drill bit assembly in this position the longitudinal axis of the drill bit 74 is coaxially aligned with the pin-tip 54. The drill bit 74 is then rotated to bore a second hole 80 into the work-piece 60. The second hole 80 extends from the second face 64 of the work-piece 60 toward the first face 62. The second hole 80 is aligned with the first hole 66 to form a combined through hole extending from the second face 64 to the first face 62. As the drill bit 74 drills the second hole 80, it is anticipated that the drill bit will engage the pin-tip 54 of the hole-locating pin 50 and push the hole-locating pin 50 from its extended position to its retracted position (FIG. 7). The spring-bias retractable characteristic of the hole-locating pin 50 resists damage to both the drill bit 74 and the pin-tip 54.

In view of the above, it will be seen that several advantageous results are attained by the present invention.

As various changes could be made in the above constructions and methods without departing from the scope of the invention, it is intended that all matter contained in the above description or shown in the accompanying drawings shall be interpreted as illustrative and not in a limiting sense. The invention therefore shall be limited solely by the scope of the claims set forth below.

What is claimed is:

1. A drill clamp comprising:
    a clamp mechanism having a first clamp portion and a second clamp portion, the second clamp portion including a drill-receiving opening sized for receiving a drill bit;
    a hole-locating pin operatively connected to the first clamp portion;
    the clamp mechanism being adapted and configured for movement of the first and second clamp portions relative to each other between clamped and unclamped positions, the hole-locating pin being farther from the drill-receiving opening when the clamp mechanism is in the unclamped position than when the clamp mechanism is in the clamped position, the hole-locating pin and the drill-receiving opening being aligned with one another when the clamp mechanism is in the clamped position;
    the first and second portions of the clamp mechanism including a slider mechanism with one of the first and second portions having a channel and the other having a mating, channel-receiving tongue, the tongue engaging with the channel to enable linear sliding movement of the first and second portions relative to each other; and
    a powered movement mechanism operably associated with the first and second portions that includes a member that moves linearly in a first direction to urge the first and second portions into engagement with one another when clamping a work piece therebetween, and moves linearly in a second direction, opposite to said first direction, to move the first and second portions away from one another after a drill operation is completed.

2. A drill clam as set forth in claim 1 wherein the hole-locating pin and the drill-receiving opening are aligned with one another throughout movement of the clamp mechanism between the unclamped and clamped positions.

3. A drill clamp as set forth in claim 1 wherein the channel comprises a C-shaped channel.

4. A drill clamp as set forth in claim 1 wherein the movement mechanism comprises an air cylinder, the air cylinder including a cylinder body, and the member forming a moveable rod extending from the cylinder body being secured to one of the first and second clamp portions, the moveable rod extending from the cylinder body and being secured to the other of the first and second clamp portions, the cylinder body being adapted and configured to extend and retract the moveable rod to cause movement of the first and second clamp portions relative to each other between clamped and unclamped positions.

5. A drill clamp as set forth in claim 4 wherein the air cylinder further includes a valve mechanism operatively connected to the cylinder body, the valve mechanism being adapted to enable a user to extend and retract the moveable rod.

6. A drill clamp as set forth in claim 4 wherein the air cylinder further includes a manifold mechanism operatively connected to the cylinder body, the manifold mechanism being adapted to control a rate of movement of the moveable rod.

7. A drill clamp as set forth in claim 4 wherein the air cylinder further includes a valve mechanism and a manifold mechanism, the valve mechanism and the manifold mechanism being operatively connected to the cylinder body, the valve mechanism being adapted to enable a user to extend and retract the moveable rod and the manifold mechanism being adapted to control a rate of movement of the moveable rod.

8. A drill clamp as set forth in claim 1 wherein the hole locating pin includes a pin tip, the pin tip being adapted to extend into a hole in a work-piece.

9. A drill clamp as set forth in claim 8 wherein the hole locating pin is adapted and configured for movement between an extended position and a retracted position.

10. A drill clamp as set forth in claim 9 further comprising a spring located in the second clamp portion and engaging the hole locating pin in a manner such that the hole locating pin is biased toward the extended position.

11. A drill clamp as set forth in claim 10 wherein the pin tip is configured and adapted to engage a drill bit received in the drill-receiving opening and moved toward the hole locating pin such that the hole locating pin moves from the extended position toward the retracted position as a drill bit is moved axially in a direction from the second clamp portion toward the first clamp portion.

12. A drill clamp comprising:
a clamp mechanism having a first clamp portion and a second clamp portion, the second clamp portion including a drill-receiving opening;
a hole-locating pin operatively connected to the first clamp portion;
the clamp mechanism being adapted and configured for movement of the first and second clamp portions relative to each other between clamped and unclamped positions, the hole-locating pin being adapted to extend into a hole in a work-piece and to position the work-piece such that a drill bit inserted through the drill-receiving opening will engage the work-piece at a location in alignment with the hole; and
a slider mechanism including a C-shaped channel and a channel-receiving tongue, one of the first and second clamp portions defining the C-shaped channel and the other of the first and second clamp portions defining the channel-receiving tongue, the C-shaped channel being sized for receiving the channel-receiving tongue to permit linear sliding of the first and second clamp portions relative to each other.

13. A drill clamp as set forth in claim 12 wherein the hole-locating pin and the drill-receiving opening are aligned with one another throughout movement of the clamp mechanism between the unclamped and clamped positions.

14. A drill clamp as set forth in claim 12 further comprising a movement mechanism operatively connected to the first and second clamp portions, the movement mechanism being adapted and configured to move the first and second clap portions relative to each other.

15. A drill clamp as set forth in claim 14 wherein the movement mechanism comprises an air cylinder, the air cylinder including a cylinder body and a moveable rod, the cylinder body being secured to one of the first and second clamp portions, the moveable rod extending from the cylinder body and being secured to the other of the first and second clamp portions, the cylinder body being adapted and configured to extend and retract the moveable rod to cause movement of the first and second clamp portions relative to each other between clamped and unclamped positions.

16. A drill clamp as set forth in claim 15 wherein the air cylinder further includes a valve mechanism operatively connected to the cylinder body, the valve mechanism being adapted to enable a user to extend and retract the moveable rod.

17. A drill clamp as set forth in claim 15 wherein the air cylinder further includes a manifold mechanism operatively connected to the cylinder body, the manifold mechanism being adapted to control a rate of movement of the moveable rod.

18. A drill clamp as set forth in claim 15 wherein the air cylinder further includes a valve mechanism and a manifold mechanism, the valve mechanism and the manifold mechanism being operatively connected to the cylinder body, the valve mechanism being adapted to enable a user to extend and retract the moveable rod and the manifold mechanism being adapted to control a rate of movement of the moveable rod.

19. A drill clamp as set forth in claim 12 further comprising means for moving the first and second clamp portions between the clamped and unclamped positions.

20. A drill clamp as set forth in claim 12 wherein the hole locating pin includes a pin tip, the pin tip being adapted to extend into a hole in a work-piece.

21. A drill clamp as set forth in claim 20 wherein the hole locating pin is adapted and configured for movement between an extended position and a retracted position.

22. A drill clamp as set forth in claim 21 further comprising a spring located in the second clamp portion and engaging the hole locating pin in a manner such that the hole locating pin is biased toward the extended position.

23. A drill clamp as set forth in claim 22 wherein the pin tip is configured and adapted to engage a drill bit received in the drill-receiving opening and moved toward the hole locating pin such that the hole locating pin moves from the extended position toward the retracted position as the drill bit is moved axially in a direction from the second clamp portion toward the first clamp portion.

24. A method comprising:
providing a drill clamp comprising a clamp mechanism and a hole-locating pin, the clamp mechanism having a first clamp portion and a second clamp portion, the second clamp portion including a drill-receiving opening sized for receiving a drill bit, the clamp mechanism being adapted and configured for movement of the first and second clamp portions relative to each other between clamped and unclamped positions, the hole-locating pin operatively connected to the first clamp portion, the hole-locating pin and the drill-receiving opening being aligned with one another when the clamp mechanism is in the clamped position;
using a slider mechanism having a channel associated with one of the first and second portions, and a channel-receiving tongue associated with the other one of the first and second portions, to enable linear sliding movement of the first and second portions relative to one another;

providing a work-piece, the work-piece having opposite first and second faces spaced from one another and a first hole extending from the first face toward the second face;

positioning the drill clamp, while in the unclamped position, relative to the work-piece, such that the hole-locating pin extends into the first hole;

using a powered movement mechanism operably associated with the first and second portions to move the clamp mechanism to the clamped position such that the clamp mechanism is clamped against the first and second faces of the work-piece while the hole-locating pin is positioned in the first hole, the clamp mechanism including a member that moves linearly in a first direction to urge the first and second portions into engagement with one another when clamping a work piece therebetween, and moves linearly in a second direction, opposite to said first direction, to move the first and second portions away from one another after a drill operation is completed;

placing a drill bit in the drill-receiving opening and using the drill bit to drill a second hole extending from the second face toward the first face, the second hole being aligned with the first hole.

* * * * *